United States Patent [19]
Patten

[11] Patent Number: 5,595,372
[45] Date of Patent: Jan. 21, 1997

[54] SEMI-ACTIVE VIBRATION MITIGATION ASSEMBLY

[75] Inventor: William N. Patten, Norman, Okla.

[73] Assignee: The Board of Regents of the University of Oklahoma, Norman, Okla.

[21] Appl. No.: 474,473

[22] Filed: Jun. 7, 1995

Related U.S. Application Data

[63] Continuation-in-part of Ser. No. 376,477, Jan. 20, 1995, abandoned, which is a continuation of Ser. No. 243,724, May 17, 1994, abandoned, which is a continuation of Ser. No. 29,849, Mar. 11, 1993, abandoned.

[51] Int. Cl.⁶ ................................ F16F 5/00; F16F 9/50
[52] U.S. Cl. ........................... 267/64.13; 267/64.26; 188/279; 188/299; 188/318; 52/167.3; 52/167.4
[58] Field of Search ........................... 188/279, 280, 188/281, 299, 313, 318, 322.18, 276, 300; 251/129.11; 52/1, 167.1, 167.2, 167.3, 167.4, 167.5, 167.6, 167.7, 167.8, 167.9; 267/64.13, 64.26

[56] References Cited

U.S. PATENT DOCUMENTS

| | | | |
|---|---|---|---|
| 3,359,802 | 12/1967 | Sollenberger et al. | 188/313 |
| 3,387,748 | 6/1968 | Brenchley | 251/129.11 X |
| 4,181,288 | 1/1980 | Bylsma | 251/129.11 |
| 4,511,022 | 4/1985 | Thomas et al. | 188/299 |
| 4,655,440 | 4/1987 | Eckert | 267/64.11 |
| 4,821,849 | 4/1989 | Miller | 188/280 |
| 4,838,392 | 6/1989 | Miller et al. | 188/277 |
| 4,887,699 | 12/1989 | Ivers et al. | 188/378 |
| 4,898,264 | 2/1990 | Miller | 188/275 |
| 4,936,423 | 6/1990 | Karnopp | 188/299 |
| 4,936,425 | 6/1990 | Boone et al. | 188/299 |
| 4,956,947 | 9/1990 | Middleton | 52/1 |
| 4,986,393 | 1/1991 | Preukschat et al. | 188/299 |
| 5,065,552 | 11/1991 | Kobori et al. | 52/1 |
| 5,147,018 | 9/1992 | Kobori et al. | 88/300 |
| 5,152,110 | 10/1992 | Garza-Tamez | 52/167 |
| 5,251,730 | 10/1993 | Ackerman et al. | 188/299 |
| 5,311,709 | 5/1994 | Kobori et al. | 52/167 |
| 5,360,230 | 11/1994 | Yamada et al. | 280/707 |
| 5,396,973 | 3/1995 | Schwemmer et al. | 188/299 |

OTHER PUBLICATIONS

Publication—U.S. National Workshop on Structural Control Research, 25–26 Oct. 1990, University of Southern California, sponsored by U.S. National Science Foundation.
Article—DE–vol. 40, Advanced Automotive Technologies ASME 1991 entitled Semi–Active Suspension Technology: An Evolutionary View.

*Primary Examiner*—Lee W. Young

[57] ABSTRACT

A semi-active vibration damping assembly for suppressing structural vibrations. The damping assembly includes a double rod hydraulic cylinder having a first fluid chamber and a second fluid chamber interconnected by a valve assembly. The hydraulic cylinder being connected within the framework of the structure and motion sensors being attached to the structure to measure movement of the structure and pressure sensors being disposed in the first and second chambers to measure the pressure differential between each chamber. In response to the motion and pressure data and the compressibility of the fluid, a controller outputs a control signal to the valve assembly in accordance with a control logic to vary the flow rate of the fluid between the first and second chambers and thereby vary the elastic deformation of the fluid and the amount of elastic energy stored in the fluid.

26 Claims, 6 Drawing Sheets

SEMI-ACTIVE VIBRATION MITIGATION ASSEMBLY

STATEMENT AS TO INVENTION RIGHTS UNDER FEDERALLY SPONSORED RESEARCH

The U.S. Government may have certain rights to this invention and the right in limited circumstances to require the patent owner to license others on reasonable terms as provided by the terms of Grant No. MSS-9202731 awarded by National Science Foundation.

CROSS REFERENCE TO RELATED APPLICATIONS

This application is a continuation-in-part of U.S. Ser. No. 08/376,477, filed Jan. 20, 1995, now abandoned, which is a continuation of U.S. Ser. No. 08/243,724, filed May 17, 1994, now abandoned, which is a continuation of U.S. Ser. No. 08/029,849, filed Mar. 11, 1993, now abandoned.

BACKGROUND OF THE INVENTION

1. Field of the Invention

The present invention relates generally to damping devices, and more particularly, but not by way of limitation, to an improved semi-active vibration mitigation assembly for suppressing vibrations of civil structures.

2. Description of Related Art

In recent years, an intensive effort has been made to develop vibration damping systems for civil structures, such as buildings and bridges, which are both economical and efficient for mitigating vibrations produced by dynamic disturbances, such as wind, vehicle loads, and seismic activity. Past efforts have produced a range of designs that include fully active vibration mitigation systems, passive vibration mitigation systems, and hybrid or semi-active vibration mitigation systems.

Active vibration mitigation systems utilize large electric motors and costly hydraulic pumping equipment to provide force inputs to a structure during a dynamic event. Passive damping systems, on the other hand, require no power and are less expensive to operate than active damping systems. However, passive vibration mitigation systems are incapable of providing the structural protection desired. Semi-active vibration mitigation systems provide a much needed middle ground between active and passive vibration mitigation systems.

The power required to operate a semi-active vibration mitigation system is low relative to the amount of energy dissipated; whereas, the amount of power required to operate a fully active vibration mitigation systems is approximately equal to or greather than the amount of energy to be dissipated.

The hardware utilized in semi-active vibration mitigation systems generally includes a high pressure hydraulic cylinder with a piston slidably disposed therein so as to form a fluid-filled chamber in each end of the cylinder. To permit fluid to flow from one chamber to the other, the chambers are fluidly interconnected with plumbing. A control valve is interposed in the plumbing to control the flow of fluid between the chambers.

Energy is dissipated from the structure to which the semi-active vibration mitigation system is connected by actuating the control valve so as to vary the flow area of the valve. The valve is actuated by control signals generated by a controller in response to data obtained from structural motion sensing devices, such as accelerometers and strain gauges, and from pressure data obtained from sensors attached to the hydraulic system. The choice of the control algorithm employed is critical to providing a stable and effective vibration mitigation system.

Previous semi-active vibration mitigation designs have utilized expensive and complex hardware and have failed to take into account certain critical variables when generating a control signal. Most particularly, previous designs have failed to consider the effects of the compressibility of the fluid. The variable stiffness of the hydraulic fluid affords an opportunity to store and release elastic energy. The capacity to both store and dissipate energy differentiates the semi-active damping assembly proposed herein from variable damping systems that have previously been employed in automotive and civil structure applications. The design proposed herein provides for the automatic regulation of the energy stored and dissipated in order to mitigate structural vibration effectively.

DETAILED DESCRIPTION

Figure 1:
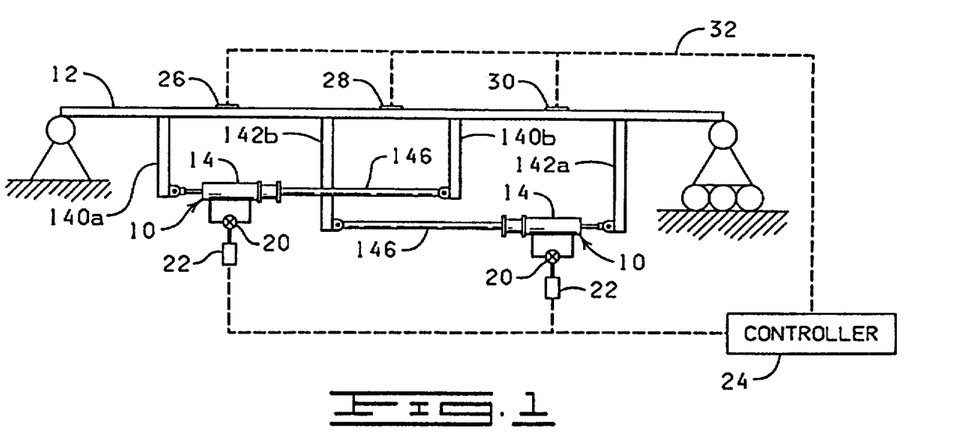
FIG. 1 is a schematic view of a bridge with a pair of semi-active vibration damping assemblies constructed in accordance with the present invention mounted thereto.

Referring now to the drawings, and more particularly to FIG. 1, a pair of vibration mitigation assemblies 10 constructed in accordance with the present invention is schematically illustrated as being mounted to the lower side of a bridge 12. Each vibration mitigation assembly 10 includes a hydraulic cylinder assembly 14, a control valve 20 for regulating the flow of the hydraulic fluid between the first and second chamber of the cylinder assembly 14, a motor 22 operably connected to the control valve 20, and a controller 24 electrically connected to the motor 22 for generating a control signal.

The controller 24 can be any suitable device for generating control signals, but a preferable device is a digital signal processor. As described in greater detail below, the control signal is generated in response to data signals produced by a variety of sensors connected to the bridge 12, such as sensors 26, 28, and 30, and transmitted to the controller 24 along signal path 32.

During a dynamic event, such as seismic activity or vehicle loads, the sensors 26–30 produce data signals indicative of the movement or deformation of the bridge 12. Other sensors (described below) produce data signals indicative of the pressure differential between a first fluid chamber of the cylinder assembly 14 and a second fluid chamber of the cylinder assembly 14, and data signals indicative of the relative velocity of a piston (described below) across the cylinder assembly 14. The controller 24 receives all the data signals and outputs a control signal to the motor 22 which throttles the control valve 20 so as to vary the orifice area of the control valve 20. The change in the orifice area affects two modes of energy transfer. First, the variation of the orifice area affects the amount of fluid flow between the first and second fluid chambers which in turn affects the amount of energy being dissipated from the structure 12. Varying the amount of energy dissipated from the structure in turn varies the apparent damping in the structure 12. Second, the variation of the orifice area affects the amount of elastic deformation of the fluid in the cylinder 38, thus making it possible to regulate the amount of elastic or strain energy stored in the fluid. Regulation of the storage of elastic energy in turn permits the regulation of the apparent stiffness of the structure 12.

Figure 2:
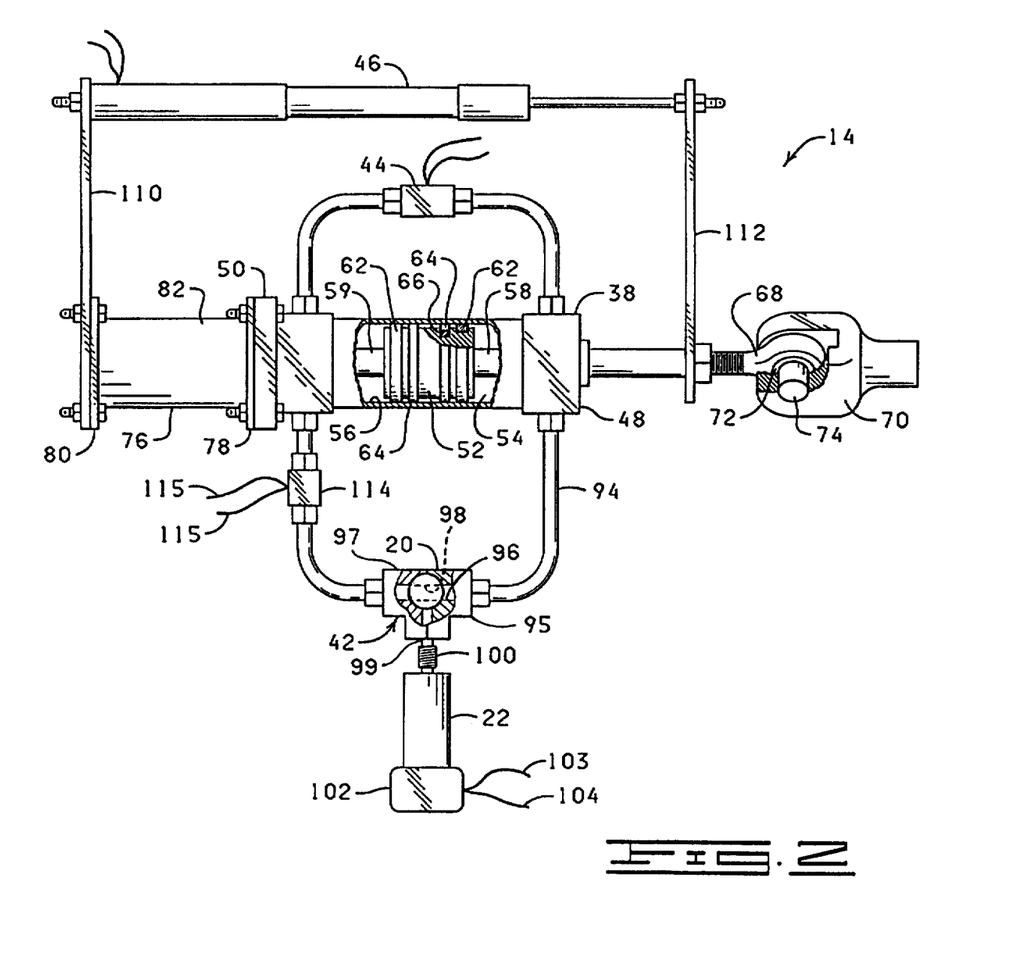
FIG. 2 is a partly cutaway, side view of a cylinder and valve assembly used in the semi-active vibration damping assembly of the present invention.

FIG. 2 shows a preferred configuration of the cylinder assembly 14 for use in the vibration mitigation assembly 10 of the present invention. The cylinder assembly 14 includes a double rod hydraulic cylinder 38, a valve assembly 42, the motor 22, a differential pressure sensor 44, and a linear variable displacement transducer (LVDT) 46.

The cylinder 38 is characterized as having a first end 48 and a second end 50. A piston 52 is slidably disposed in the cylinder 38 so as to form a first fluid chamber 54 and a second fluid chamber 56. The piston 52 has a piston rod 58 extending from one face of the piston 52 and a piston rod 59 extending from the opposite face of the piston 52. The piston rod 58 slidably extends from the first end 48 of the cylinder 38 and has a rod end 68, and the piston rod 59 slidably extends from the second end 50 of the cylinder 38 and has a free rod end (not shown).

The piston 52 is provided with a piston seal assembly that specifically meets the needs of a semi-active vibration damping system. The seal assembly includes a pair of bearings 62, a pair of seal rings 64 and a pair of energizing rings 66. The seal rings 66 and the energizing rings are disposed in an annular groove provided in the piston 52 substantially as shown in FIG. 2. The seal rings 64 and the energizing rings 66 cooperate to form a fluid tight seal between the piston 52 and the sidewall of the cylinder 38. The seal rings 64 are constructed of a material having a low coefficient of friction, such as tephlon, and have a symmetrical geometric configuration to provide uniform frictional engagement with the sidewall of the cylinder 38.

A typical U-cup seal member, which is often used in active damping systems is not well suited to semi-active damping applications. The U-cup seal is a hydraulic pressure energized device. As hydraulic pressure increases, the seal cross-section distorts resulting in increased contact force with the sidewall of the cylinder thus increasing the friction between the seal member and the cylinder. The geometry of the U-cup seal is effective in an active damping system because the induced velocity in the cylinder is typically in the same direction as the net force on the piston due to the differential pressure in the two fluid chambers. Therefore, the friction force acts to restore the original shape of the seal member. However, the orientation between the net force and the velocity in the semi-active damping system is opposite to the active damping system. Thus, in a semi-active system the friction force adds to the distortion of the seal member and increases the total friction like a self actuating brake mechanism, thereby impeding the performance of the semi-active damping assembly.

The bearings 62 are disposed in the piston 52 to the outside of the seal rings 64, as shown. The bearings 62 are constructed of a material having a low coefficient of friction, such as nylon or graphite. The bearings 62 function to maintain uniform contact between the piston 52 and the sidewall of the cylinder 38. Any torque imparted to the cylinder assembly 14 is transmitted to the bearings 62, as opposed to the seal rings 64, thus preventing fluid leakage about the piston 52.

The rod end 68 is adapted to be pivotally connected to a clevis 70, thereby permitting the piston rod 58 to be connected to the bridge 12, or other structure, in a manner that will be discussed below. The rod end 68 is provided with a rod end bearing 72 which is adapted to pivotally receive a connecting rod 74 which is connected to the clevis 70. It is important that tight tolerances with low friction be maintained between the rod end bearing 72 and the connecting rod 74 to ensure proper operation of the vibration mitigation assembly 10. To this end, use of a bronze teflon bearing is preferred.

The second end 50 of the cylinder 38 is adapted to be connected to another portion of the bridge 12. More particularly, the second end 50 of the cylinder 38 is connected to a rod housing 76 which includes a first flanged end 78, a second flanged end 80 and a medial portion 82. As shown, the second end 50 of the cylinder 38 is connected to the first flanged end 78 of the rod housing 76. The first flanged end 78 and the medial portion 82 of the rod housing 76 are constructed to reciprocally receive the free rod end (not shown) of the piston rod 59 as the piston 52 moves within the cylinder 38. The second flanged end 80 is connectable to the bridge 12 in a manner described below.

The valve assembly 42 includes the control valve 20 and a fluid conduit 94. The fluid conduit 94 extends from the first fluid chamber 54 to the second fluid chamber 56, thus providing fluid communication between the first fluid chamber 54 and the second fluid chamber 56. The control valve 20 is interposed in the fluid conduit 94 for regulating the flow of the fluid between the first fluid chamber 54 and the second fluid chamber 56.

A preferable control valve is a globe valve manufactured by the Whitey Corporation, model number SS-33 VF4, which is modified with a low friction seal (not shown) in order to afford high speed changes in the valve opening when in operation. The control valve 20 includes a valve body 95 having a flow bore 96 extending therethrough and a valve ball 97 with a fluid flow passageway 98 extending therethrough. As will be described in further detail below, the configuration of the fluid flow passageway is varied dependent upon the type of control logic employed to govern the control valve 20.

The fluid conduit 94 is adapted to be connected to an accumulator (not shown) if desired. However, an accumulator is not required in the vibration mitigation assembly 10 of the present invention.

The valve ball 97 is rotatable between a full open position wherein the fluid flow passageway 98 of the valve ball 97 is aligned with the flow bore 96 of the valve body 95 and a full closed position wherein the fluid flow passageway 98 of the valve ball 97 is sealed from the flow bore 96 of the valve body 95. The valve ball 97 is rotated between the full open position and the full closed position by the motor 22 which is connected to the valve ball 97 via a valve stem 99 and a shaft coupling 100. The motor 22 is preferably a dc motor that is able during operation to be rotated 45° in less than 0.01 seconds. Such a motor is available from Hewlett Packard, model number T03L-QU99 (B87779-01). The motor 22 is provided with an encoder 102 which generates a signal indicative of the angle of rotation of the shaft of the motor 22 and thus the position of the valve ball 97 of the control valve 20. The motor 22 is electrically connected to the controller 24 via electric leads 103, 104. The shaft coupling 100 is preferably a helical flexible shaft coupling such as available from the Berg Corporation, model No. ACR112-12-8. This type of coupling allows for misalignment between the shaft of the motor 22 and the valve stem 99 of the control valve 20 while being torsionally rigid, thus minimizing the torque load on the motor 22.

The differential pressure sensor 44 is disposed in fluid communication between the first fluid chamber 54 and the second fluid chamber 56, and the LVDT 46 is mounted parallel to the piston rod 58 to measure the position of the piston 52. More specifically, the LVDT 46 has one end fixed to a bracket 110 mounted to the rod housing 76 and extending outward a distance therefrom. The opposite end of the LVDT 46 is mounted to a bracket 112 mounted on the piston rod 58.

The control logics (described below), for generating the control signals that throttle the control valve 20, take into account the compressibility of the hydraulic fluid. A change in the temperature of the hydraulic fluid changes the compressibility of the hydraulic fluid. Therefore, a temperature sensor 114, which is connected to the controller 24 via leads 115, is provided to measure the temperature of the hydraulic fluid.

In operation, deflection of the bridge 12 will apply pressure, via the piston 52, to one of the fluid chambers 54 or 56. The applied pressure will cause hydraulic fluid to flow from the pressurized fluid chamber 54 or 56 through the fluid conduit 94 and the control valve 20. The size of the fluid flow passageway in the control valve 20 will determine at least part of the resistance provided by the vibration mitigation assembly 10. When the bridge 12 moves in the opposite direction and causes the piston 52 to move in the opposite direction, pressure is applied to the other fluid chamber 54 or 56, causing at least a portion of the hydraulic fluid contained therein to flow through the fluid conduit 94 and the control valve 20 in the opposite direction.

The size of the fluid passageway within the control valve 20 is determined by a control signal generated by the controller 24, as will be explained below. The control signal is sent via the electric leads 103, 104 to the motor 22 which in turn positions the control valve 20.

The controller 24 receives data signals from the sensors 26–30 which include accelerometers and strain gauges positioned on the bridge 12 and connected to the controller 24 via signal path 32 (FIG. 1). It will be appreciated that a plurality of accelerometers and a plurality of strain gauges may be used with each of the accelerometers and strain gauges generating data signals to the controller 24. Alternatively, displacement, velocity or acceleration sensors can be used.

The control signals for adjusting the control valve 20 can be generated by several different algorithms. Two effective algorithms are described herein. Adopting a simplified single degree of freedom mass, spring damper model of a structure system and affixing a vibration mitigation system to it, then the physics of the process can be determined. By employing flow continuity, an energy balance across the control valve 20, and accounting for fluid compressibility effects, the following system of hydraulic equations result:

A force balance on the mass (the bridge 12) yields:

$$m\ddot{y}+c\dot{y}+Ky+A\cdot(p_1-p_2)=0 \tag{1}$$

where m is the mass of the structure, y is the relative displacement across the cylinder, c is the amount of natural damping in the structure, K is the elastic stiffness of the structure, A is the area of the piston face, $P_1$ is the pressure in the first fluid chamber, and $P_2$ is the pressure in the second fluid chamber.

Flow continuity requires;

$$q_1+q_2=0 \tag{2}$$

where $q_1$, $q_2$ are flows from chambers 54 and 56.

The flow to or from a chamber must reflect the time variation of the volume due to the piston motion and the compressibility of the fluid;

$$q_1 = A\dot{y} - \frac{V_1(t)}{\beta} \cdot \dot{p}_1 \tag{3}$$

$$q_2 = -A\dot{y} + \frac{V_2(t)}{\beta} \cdot \dot{p}_2$$

where $\beta$ is assumed here to be a non-time varying compressibility coefficient for the fluid. In practice, temperature, cavitation, and aeration can change the compressibility characteristic dramatically. An analysis that does not include compressibility will yield erroneous and possibly contradictory results. The time varying volume can be expressed as;

$$V_1(t)=V_{io}\pm Ay \tag{4}$$

where $V_{io}$ is the nominal volume of the chamber. The flow through the control valve 20 is characterized as;

$$q = \text{sign}\,(\Delta p) \cdot C \cdot A_v \cdot \sqrt{\frac{2}{\rho}\,|\Delta p|} \tag{5}$$

where $\Delta p$ is the pressure difference across the valve and $\rho$ is the density of the hydraulic fluid. The variable $A_v$, represents the degree to which the valve is opened or closed.

Combining the force balance with the continuity equation and the control valve characteristic, and introducing the following state variable definitions $$x_1=y\;;\;x_2=\dot{y}\;; \tag{6}$$

$$x_3=p_1;\;x_4=p_2$$

then the state of the system can be expressed as $$\dot{x}_1 = x_2 \tag{7}$$

$$\dot{x}_2 = -\frac{1}{m}(kx_1 + cx_2 + A(x_3 - x_4))$$

$$\dot{X}_3 = \frac{\beta}{V_1} - Ax_2 + \text{sgn}(x_3, x_4) \cdot f(x_3, x_4)$$

$$\dot{X}_4 = -\frac{v_1}{v_2} \cdot \dot{x}_3$$

where $$\text{sgn}(x_3, x_4) = \begin{pmatrix} +\text{sign}(x_3 - x_4) & \text{if } P_1 > P_2 \\ -\text{sign}(x_3 - x_4) & \text{if } P_1 < P_2 \end{pmatrix} \tag{8}$$

and $$f(x_3, x_4) = CA_v \sqrt{\frac{2}{\rho} |x_3 - x_4|} \tag{9}$$

The above system of equations is highly nonlinear. Two effective feedback control logics for providing vibration suppression are described next.

1. Clipped Optimal Control

Figure 3:
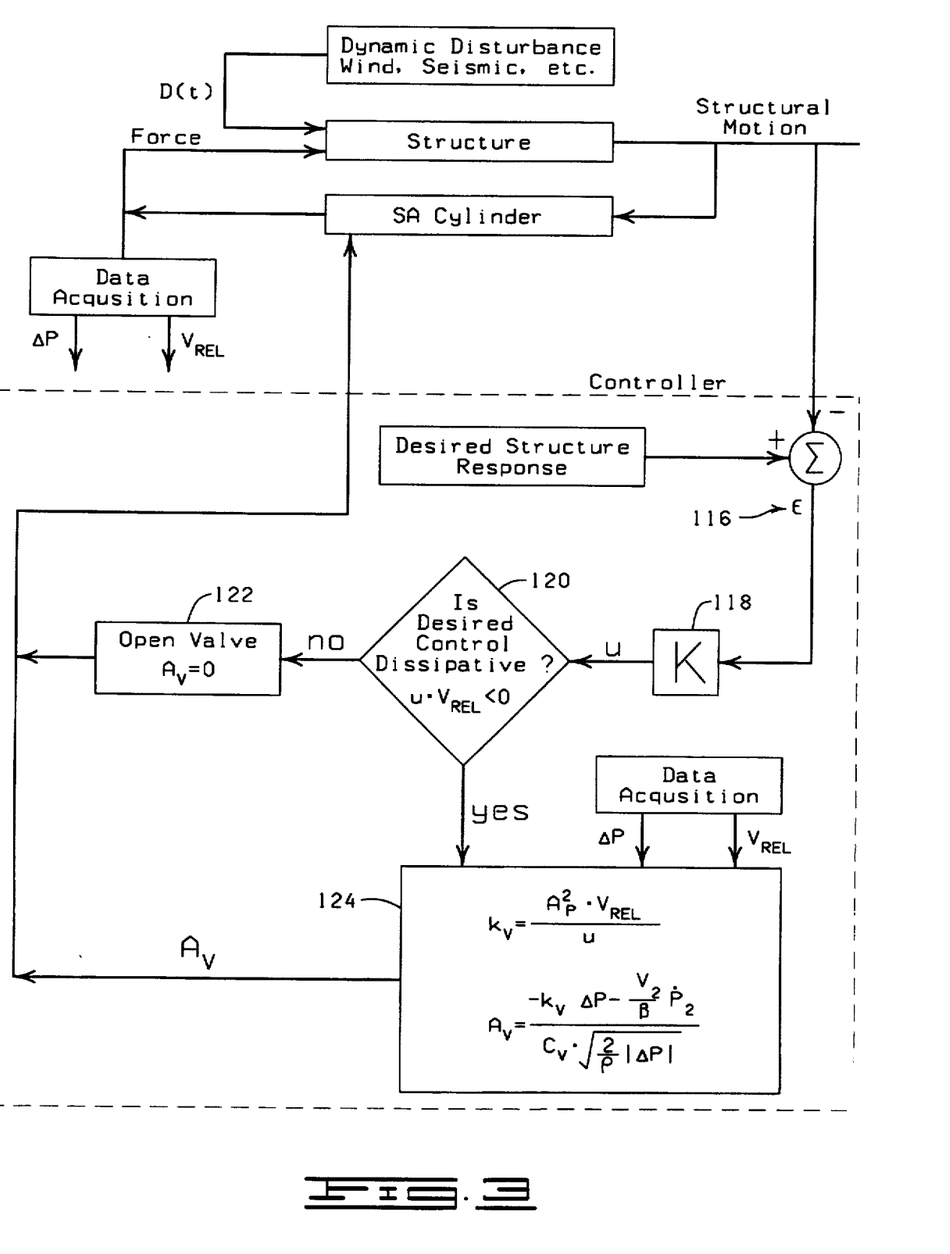
FIG. 3 is a flow diagram illustrating the regulation of the control valve using a clipped optimal control logic.

FIG. 3 shows a flow chart for a clipped optimal control logic. Valve regulation is accomplished by sensing the pressure differential of the first and second fluid chambers 54, 56 and the motion of the structure and the piston 52, and sending this data to the controller 24. The clipped optimal control relies on the application of a Linear Quadratic Regulator (LQR) design. This produces an outer loop control. The design next uses an inner loop control to linearize the input/output characteristics of the vibration mitigation assembly 10.

The controller 24 compares the existing dynamic state of the structure with the desired dynamic state (usually no motion), and forms a vector of errors (116), which are then multiplied by a preoptimized feedback gain K (118), thereby producing a desired control force u. Next, the control force u is checked to determine if it is dissipative (120). If the control force u is nondissipative, then the control valve is moved to the full open position (122). If the desired force is dissipative, then the linearizing inner loop logic is used along with the measured (and estimated) states of the structure and the cylinder assembly 14 to determine the correct flow area of the control valve 20. The control valve 20 is then adjusted (124) and the process repeated.

The coupled, nonlinear cylinder dynamics raise the question of whether a control logic for a hydraulic semi-active damping assembly can be stable. The concern is raised in particular because the regulation of the control valve 20 in effect adds stiffness to the coupled structure/cylinder system. The variable stiffness, which is due to the compressibility of the hydraulic fluid, produces an opportunity to store and release energy, which is a nondissipative effect and invalidates the assumption that variation of the control valve always produces a dissipative force.

In order to take advantage of both the dissipative and nondissipative effects of hydraulic fluid, utilization of hydraulic fluid having an amount of air entrained therein is preferred. To this end, a preferred amount of air in the hydraulic fluid is an amount that will produce an effective compressibility of the fluid/air mix that is about 100 times more compressible than commercially available hydraulic fluid, or in a range from about $2.7 \times 10^6$ m²/N to about $2.7 \times 10^8$ m²/N.

Figure 4:
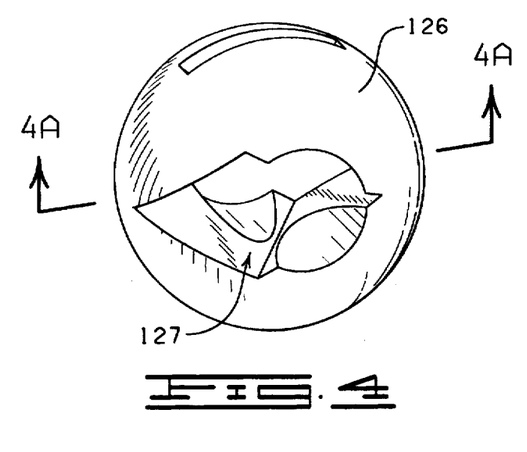
FIG. 4 is a perspective view of a valve ball having a fluid flow passageway with an eye shaped configuration for use with the clipped optimal control logic.
Figure 4A:
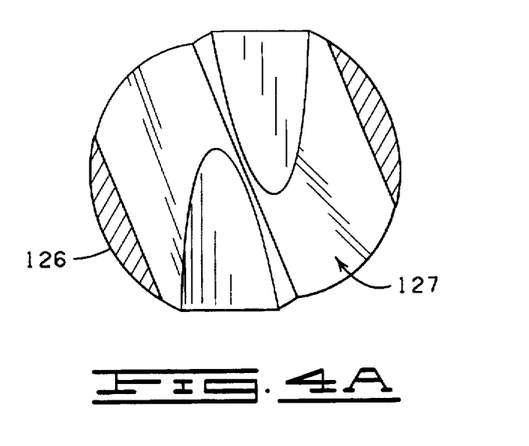
FIG. 4A is a cross-section taken along lines 4A—4A in FIG. 4.

To further stabilize and improve the performance of the vibration mitigation assembly 10 when utilizing the clipped optimal control logic, the control valve 20 is provided with a valve ball 126 having an eye shaped fluid flow passageway 127, as illustrated in FIGS. 4 and 4A. The eye shaped fluid flow passageway provides a variable fluid flow passageway which functions to eliminate the sudden shock imparted to the system upon opening and closing the control valve 20.

2. Bistate (On-off) Control

Figure 5:
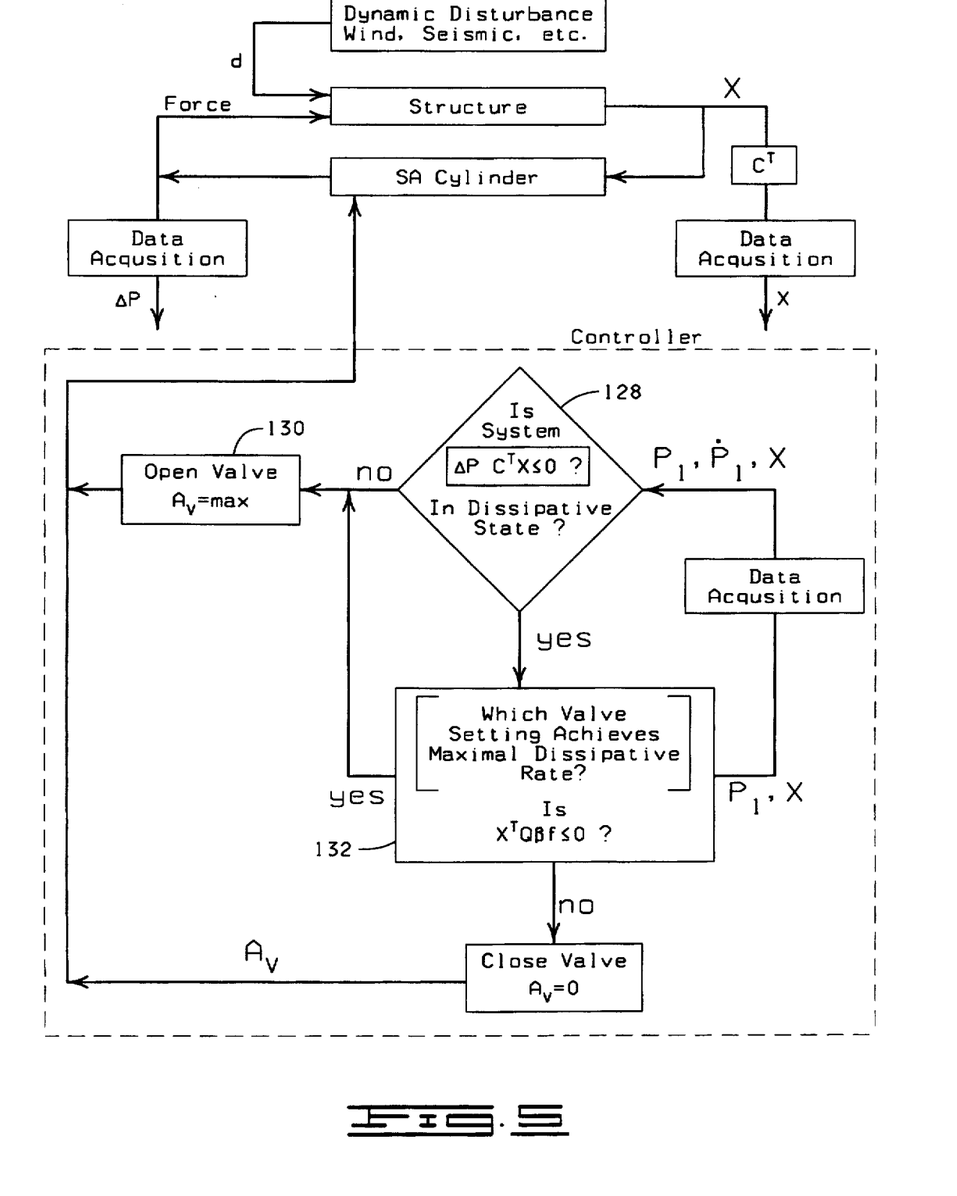
FIG. 5 is a flow diagram illustrating the regulation of the control valve using a bistate control logic.

Referring now to FIG. 5, shown is a flow chart for a bistate (on-off) control logic. The clipped optimal control design described above is suboptimal. The algorithm fails to take advantage of the possible effectiveness of the vibration mitigation assembly 10 because it fails to address the nonlinearity of the damping system when making decisions. The bistate control described herein is based on an extension of Layapunov's Theory. This algorithm maximizes the rate at which vibration energy of the structure is dissipated.

Like the clipped optimal control, valve regulation is first accomplished with the bistate control logic by sensing the pressure differential of the first and second fluid chambers 54, 56 and the motion of the structure and the piston 52, and sending this data to the controller 24. The controller 24 first checks to determine if the current state of the cylinder assembly 14 is nondissipative (128), where $C^T$ is an algebraic mapping between the motion of the structure 12 and the outputs of the sensors 26–30 used to detect the motion. If the cylinder assembly 14 is nondissipative, then the control valve 20 is set to the full open position and the cycle is repeated (130). If the current state of the cylinder assembly 14 is dissipative, then the optimality of the dissipative state is determined. This is accomplished by checking the inequality shown at (132), where Q is any designer specified positive definite matrix. If the test (for sign) fails, then the control valve 20 is set to the full closed position; otherwise, the control valve 20 is set to the full open position. The process is then repeated. In the equality given at 132, the expression $f(X_1P)$ is as follows:

if $P_1 \geq P_2$ then, $$f(X, P) = -\frac{\beta}{V_1} \cdot C_v \cdot \sqrt{\frac{2}{\rho} \cdot |\Delta P|} \tag{10}$$

$$\left[ 1 + \frac{\frac{V_1}{\beta}}{\frac{V_2}{\beta} + \left(1 + \frac{V_1}{V_2}\right)} \right]$$

else if $P_2 > P_1$ then, $$f(X, P) = -\frac{\beta}{V_2} \cdot C_v \cdot \sqrt{\frac{2}{\rho} \cdot |\Delta P|} \tag{11}$$

$$\left[ 1 + \frac{\frac{V_2}{\beta}}{\frac{V_1}{\beta} + \left(1 + \frac{V_2}{V_1}\right)} \right]$$

As described above in reference to the clipped optimal control logic, the bistate control logic is designed to take advantage of both the dissipative and nondissipative effects of hydraulic fluid. Therefore, utilization of hydraulic fluid having an amount of air entrained therein to produce a hydraulic fluid having a compressibility that is about 100 times more compressible than commercially available hydraulic fluid, or in a range from about $2.7\times10^6$ m²/N to about $2.7\times10^8$ m²/N.

Figure 6:
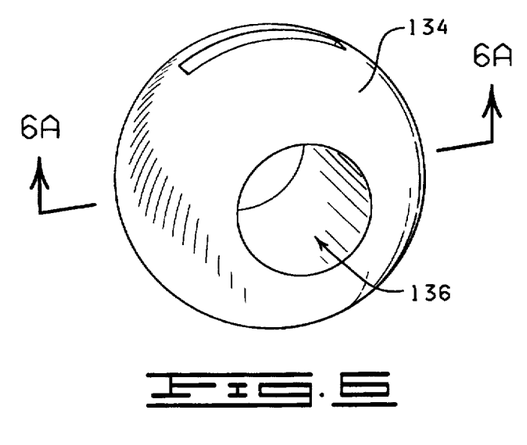
FIG. 6 is a perspective view of a valve ball having a straight fluid flow passageway for use with the bistate control logic.
Figure 6A:
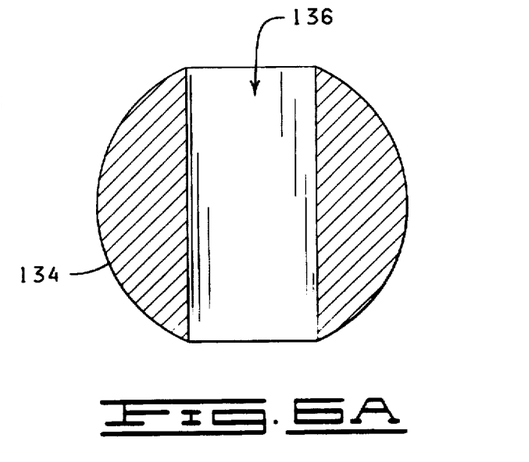
FIG. 6A is a cross-section taken along lines 6A—6A in FIG. 6.

In contrast to the clipped optimal control logic, the control valve 20 employed with the bistate control logic is provided with a valve ball 134 having straight fluid flow passageway 136, as illustrated in FIGS. 6 and 6A.

Applications of the Vibration Mitigation Assembly

Figure 7:
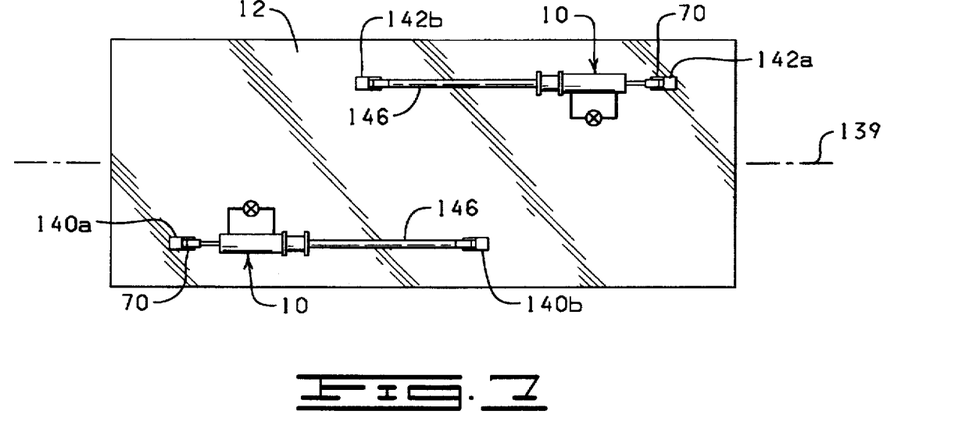
FIG. 7 is a schematic, bottom view of the bridge of FIG. 1.

As illustrated in FIGS. 1 and 7, the vibration mitigation assembly 10 is mountable to a bridge, such as the bridge 12, to suppress vibrations caused by dynamic disturbances, such as wind, vehicle loads, and seismic activity. The bridge 12 is characterized as having a longitudinal axis 139 (FIG. 7). FIGS. 1 and 7 depict one manner of attaching the damping assembly 10 to the bridge 12.

More specifically, FIGS. 1 and 7 illustrate a pair of the damping assemblies 10 mounted to the lower side of the bridge 12. To enhance the supression of vibration imparted to the bridge 12, the vibration mitigation assemblies 10 are mounted to the bridge 12 in an overlapping, parallel relationship. Each vibration mitigation assembly 10 is mounted to the bridge 12 by pivotally connecting the vibration mitigation assemblies 10 between a pair of beam members 140a, 140b and 142a, 142b which are connected to and extended downward from the lower side of the bridge 12. The beam members 140a, 140b, 142a, and 142b are positioned on the lower side of the bridge 12 such that the second pair of beam members 142a, 142b are spaced apart a predetermined distance along a line parallel to the longitudinal axis 139 of the bridge 12 and spaced from the first beam members 140a and 140b in a staggered relationship.

In the arrangement shown in FIGS. 1 and 7, the beam members 140a, 140b, 142a, and 142b are shown to be attached to the lower side of the bridge 12 at the ⅕th points of the span of the bridge 12. It will be appreciated by those of ordinary skill in the art that other configurations and arrangements for mounting the vibration mitigation assembly 10 of the present invention to a bridge exist and that the particular arrangement employed will depend in a large part on the structural design of the bridge on which the vibration mitigation assembly 10 is to be employed.

The first and second vibration mitigation assemblies 10 are pivotally mounted between the beam members 140a, 140b and 142a, 142b, respectively, as substantially shown in FIGS. 1 and 7. More specifically, the first vibration mitigation assembly 10 is pivotally mounted between beam members 140a and 140b by attaching the clevis 70 of the cylinder assembly 14 (FIG. 2) to end the beam member 140a. The second end 50 of the cylinder 38 is connected to the end of the beam member 140a via a rigid extension member 146. The rigid extension member 146 is rigidly connected to the second flanged end 80 of the rod housing 76 and the other end of the rigid extension member 146 is pivotally connected to the end of the beam member 140b. Like the pivot connection between the rod end 68 and the clevis 70, it is important that tight tolerances with low friction engagement be maintained between the pivot connection of the rigid extension member 146 and the beam member 140a. The second vibration mitigation assembly 10 is pivotally mounted between the beam members 142a and 142b in an identical manner.

Figure 8:
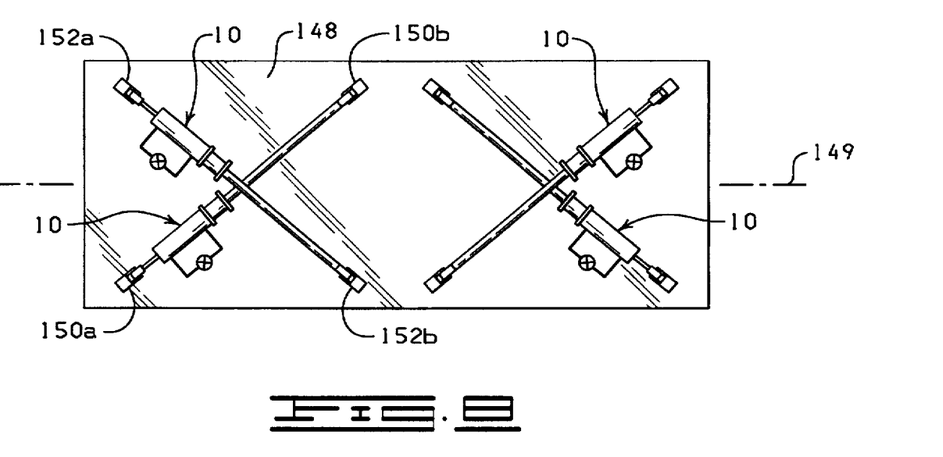
FIG. 8 is a schematic, bottom view of a bridge showing a plurality of the semi-active vibration damping assemblies of the present invention attached to the bridge in a criss-cross arrangement.

FIG. 8 is a bottom view of a bridge 148 characterized as having a longitudinal axis 149 and illustrating another arrangement of vibration mitigation assemblies 10 wherein the vibration mitigation assemblies 10 are mounted to the lower side of the bridge 148 in a pair of criss-cross configurations. More particularly, the vibration mitigation assemblies are pivotally mounted between a pair of beam members 150a, 150b and 152a, 152b connected to the lower side of the bridge 148 with the second end extending a distance downward therefrom such that the second pair of beam members 152a, 152b are spaced apart a predetermined distance along a line angularly disposed relative to the longitudinal axis 149 of the bridge 148 in an angular opposing relationship relative to the first pair of beam members 150a and 150b.

The first vibration mitigation assemblies 10, which comprises a portion of the criss-cross configuration, is pivotally connected between the beam members 150a and 150b in a manner similar to that described above in reference to the overlapping, parallel arrangement. The second vibration mitigation assembly 10 is pivotally connected between the beam members 152a and 152b, which are greater in length than the beam members 150a, 150b. Thus, the second vibration mitigation assembly 10 mounted between the beam members 152a and 152b is able to be mounted a distance below the first vibration mitigation assembly 10 mounted between the beam members 150a, 150b and form a criss-cross configuration on the lower side of the bridge 12. The other criss-cross arrangement shown in FIG. 8 is formed in a similar manner.

Figure 9:
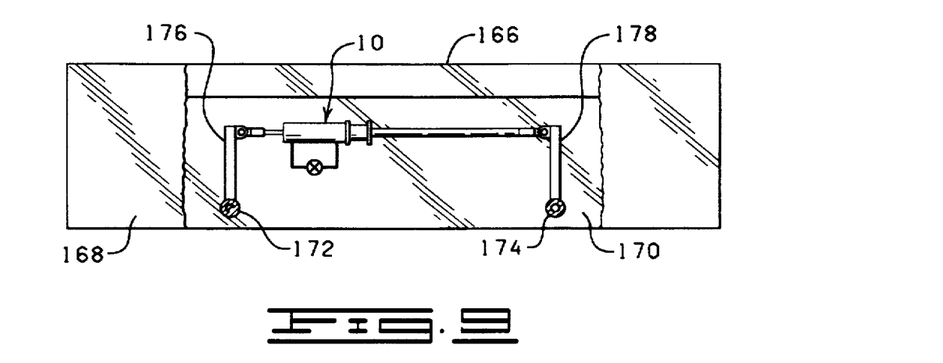
FIG. 9 is a partly cutaway, schematic side view of a bridge illustrating another manner of attaching the semi-active vibration mitigation assembly of the present invention to a bridge.

FIG. 9 illustrates another manner of mounting the vibration mitigation assembly 10 of the present invention to a bridge 166. The bridge 166 has at least two longitudinal beams 168 and 170. A pair of torque bars 172 and 174 are secured between the beams 168 and 170 a predetermined distance apart. The vibration mitigation assembly 10 is mounted to a pair of beam members 176 and 178 extended upward from a medial portion of the torque bars 172 and 174, respectively. It will be understood that the vibration mitigation assembly 10 is then mounted between the beam members 176 and 178 in an identical manner to that described above in reference to FIGS. 1 and 7. The advantage of this arrangement is that the vibration mitigation assembly 10 is contained within the bridge structure and thus does not extend downward from the bridge 12 in a manner that may obstruct the passage of objects, such as vehicles under the bridge 12.

Figure 10:
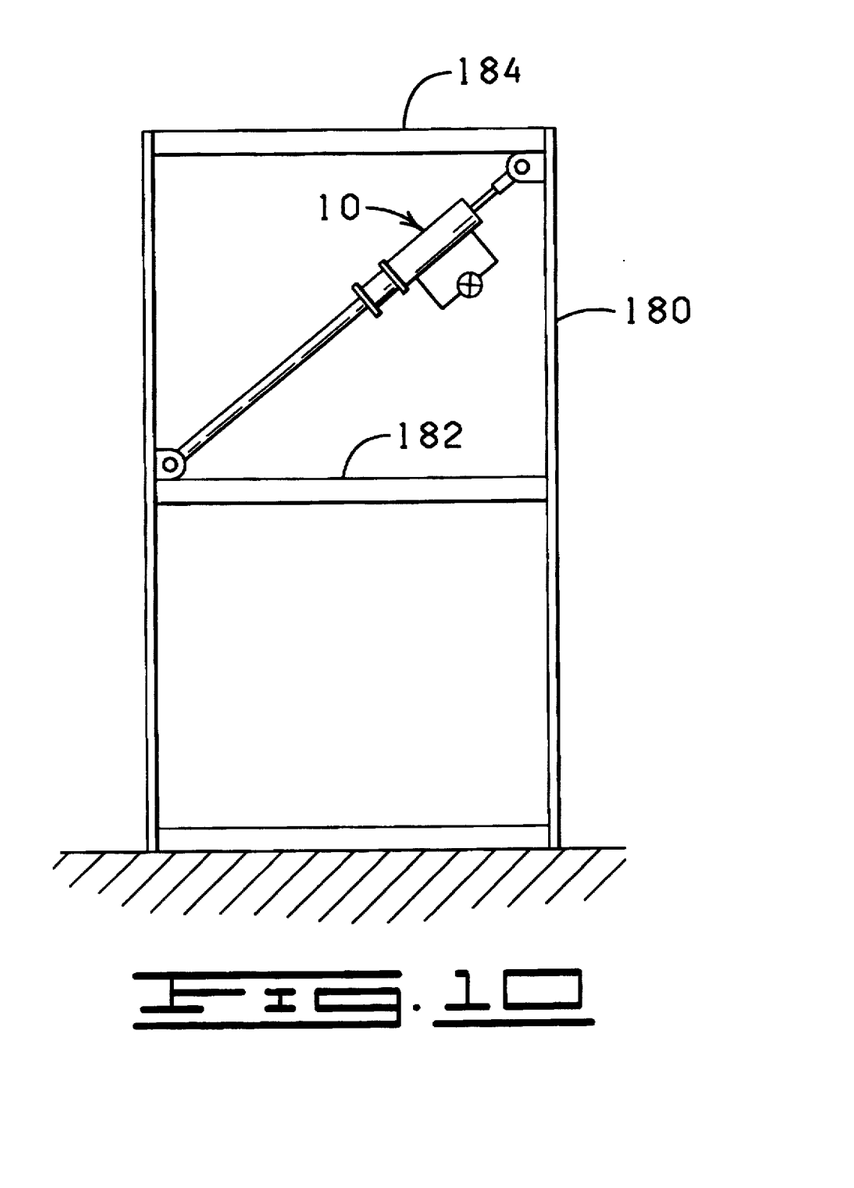
FIG. 10 is a schematic, side view of a building having the semi-active vibration damping assembly of the present invention incorporated therein.

In addition to suppressing vibrations of a bridge, the present invention can be employed in a building structure to suppress vibrations caused by seismic activity. FIG. 10 illustrates one manner of incorporating the vibration mitigation assembly 10 between adjacent floors of a building structure 180. The vibration mitigation assembly 10 is connected to an outer portion of a floor 182 and connected to an outer portion of an adjacent floor 184 such that the vibration mitigation assembly 10 extends diagonally from one floor to the other floor. The vibration mitigation assembly 10 is pivotally mounted in the building structure 180 by utilizing a rigid extension member 184 in a manner similar to that described above in reference to the bridges 12, 148 and 166.

The advantage of the present invention is that it allows civil structures to be retrofitted with a vibration mitigation assembly that can extend the life of such structures at a low cost. The vibration mitigation assembly of the present invention provides a practical and cost effective manner of significantly reducing the maximum amplitude of vibration and thus decreasing the stress range of the structures and extending the fatigue life of the structure. The vibration mitigation assembly described herein is composed of components that require no line power to operate, but which provide large corrective forces on demand by varying the fluid flow area of a control valve that is actuated by a small direct current motor requiring only the power provided by a small battery. The ability to operate the vibration mitigation assembly with a battery is important at times when line power is interrupted, such as during an earthquake.

While the vibration mitigation assembly 10 of the present invention has been described as being employed with a bridge and in a building, it will be understood that the vibration mitigation assembly 10 of the present invention can be used to suppress unwanted vibration in other structures, including for example, offshore oil platforms, transmission towers for high voltage lines, support assemblies for monorail and railway systems, and vehicle suspensions.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. A semi-active vibration mitigation assembly for suppressing vibration of a structure, comprising:

a cylinder having a first end and a second end, the second end of the cylinder adapted to be connected to a portion of the structure;

a piston slidably disposed in the cylinder, the piston defining a first fluid chamber and a second fluid chamber in the cylinder with each of the first and second fluid chambers having a compressible fluid disposed therein;

a piston rod having one end connected to the piston and another end extending from the first end of the cylinder and adapted to be connected to another portion of the structure;

valve means for interconnecting the first fluid chamber to the second fluid chamber so as to provide fluid flow between the first fluid chamber and the second fluid chamber and for regulating the flow of the fluid between the first fluid chamber and the second fluid chamber;

structural sensor means for measuring the vibration of the structure and for generating a data signal representing the vibration of the structure;

piston sensor means for measuring the movement of the piston relative to the cylinder and for generating a data signal representing the movement of the piston relative to the cylinder;

pressure sensor means for measuring the pressure in the first fluid chamber and the second fluid chamber and for generating a data signal representing the pressure differential between the first fluid chamber and the second fluid chamber; and control means operably connected to the valve means for generating a control signal in response to the data signals received by the control means from the structure sensor means, the piston sensor means, and the pressure sensor means, and for outputting the control signal to the valve means to regulate the flow of the fluid between the first and second fluid chambers of the cylinder such that elastic energy generated by elastic deformation of the compressible fluid in the first and second fluid chambers is selectively stored in and released from the fluid and the amount of vibration energy dissipated by the vibration mitigation assembly is selectively varied whereby both a stiffness of the vibration mitigation assembly and the amount of damping are continuously adjusted to maximize the suppression of the vibrations.

2. The assembly of claim 1 wherein the control signal positions the valve means in one of a full open position and a full closed position.

3. The assembly of claim 2 wherein the valve means comprises:

a valve body having a flow bore extending therethrough; and a valve ball disposed in the flow bore for rotational movement across the flow bore to control flow through the flow bore, the valve ball having a cylindrical fluid flow passageway extending through the valve ball.

4. The assembly of claim 1 wherein the control signal variably positions the valve means from a full open position to full closed position.

5. The assembly of claim 4 wherein the valve means comprises:

a valve body having a flow bore extending therethrough; and a valve ball disposed in the flow bore for rotational movement across the flow bore to control flow through the flow bore, the valve ball having a fluid flow passageway extending through the valve ball, the fluid flow passageway having a substantially eye shaped configuration so as to provide a variable fluid flow passageway.

6. The assembly of claim 1 wherein the compressibility of the fluid is in a range of about $2.7\times10^6$ m$^2$/N to about $2.7\times10^8$ m$^2$/N.

7. The assembly of claim 1 further comprising:

temperature sensor means electrically connected to the control means for measuring the temperature of the fluid and for generating a data signal representing the temperature of the fluid.

8. The assembly of claim 1 wherein the piston is provided with an annular groove and wherein the piston has a seal assembly comprising:

a seal member having a symmetrical geometric cross-section disposed in the annular grooves such that the seal member is sealingly engagable against the sidewall of the cylinder so as to effect a fluid tight seal between the piston and the cylinder.

9. The assembly of claim 1 wherein the control means is connected to the valve means via a dc motor.

10. The assembly of claim 9 wherein the motor is connected to the valve means via a flexible helical coupling which is axially flexible while being torsionally rigid to minimize torque load on the motor.

11. The assembly of claim 9 wherein the motor is powered by a battery.

12. A method for suppressing vibration of a structure, the method comprising the steps of:

providing a cylinder having a first end and a second end with a piston slidably disposed in the cylinder so as to define a first fluid chamber and a second fluid chamber in the cylinder, the piston having a piston rod extending from the first end of the cylinder, each of the first and second pressure chambers having a compressible fluid disposed therein;

interconnecting the first fluid chamber and the second fluid chamber with a valve assembly so as to provide regulated fluid communication between the first fluid chamber and the second fluid chamber;

connecting the first end of the cylinder to a portion of the structure and connecting the piston rod to another portion of the structure;

sensing vibration of the structure and generating a data signal representing the vibration of the structure;

sensing movement of the piston relative to the cylinder and generating a data signal representing the movement of the piston relative to the cylinder;

measuring the pressure in the first fluid chamber and the second fluid chamber and generating a data signal representing the pressure differential between the first fluid chamber and the second fluid chamber;

generating a control signal in response to the data signals representing the vibration of the structure, the data signal representing the movement of the piston relative to the cylinder, and the data signal representing the pressure differential between the first fluid chamber and the second fluid chamber; and outputting the control signal to the valve assembly to regulate the flow of the fluid between the first and second fluid chambers of the cylinder such that elastic energy generated by elastic deformation of the compressible fluid in the first and second fluid chambers is selectively stored in and released from the fluid and the amount of vibration energy dissipated from the structure is selectively varied whereby both a stiffness of the structure and the amount of damping of the vibration of the structure are continuously adjusted to maximize the suppression of the vibration of the structure.

13. An assembly, comprising:

a bridge; and a vibration mitigation assembly for suppressing vibration of the bridge, the vibration mitigation assembly comprising:

a cylinder having a first end and a second end, the second end of the cylinder being connected to a portion of the bridge;

a piston slidably disposed in the cylinder, the piston defining a first fluid chamber and a second fluid chamber in the cylinder with each of the first and second fluid chambers having a compressible fluid disposed therein;

a piston rod having one end connected to the piston and another end extending from the first end of the cylinder and connected to another portion of the bridge;

valve means for interconnecting the first fluid chamber to the second fluid chamber so as to provide fluid flow between the first fluid chamber and the second fluid chamber and for regulating the flow of the fluid between the first fluid chamber and the second fluid chamber;

structural sensor means for measuring the vibration of the bridge and for generating a data signal representing the vibration of the bridge;

piston sensor means for measuring the movement of the piston relative to the cylinder and for generating a data signal representing the movement of the piston relative to the cylinder;

pressure sensor means for measuring the pressure in the first fluid chamber and the second fluid chamber and for generating a data signal representing the pressure differential between the first fluid chamber and the second fluid chamber; and control means operably connected to the valve means for generating a control signal in response to the data signals received by the control means from the structure sensor means, the piston sensor means, and the pressure sensor means, and for outputting the control signal to the valve means to regulate the flow of the fluid between the first and second fluid chambers of the cylinder such that elastic energy generated by elastic deformation of the compressible fluid in the first and second fluid chambers is selectively stored in and released from the fluid and the amount of vibration energy dissipated from the bridge is selectively varied whereby both a stiffness of the bridge and the amount of damping of the vibration of the bridge are continuously adjusted to maximize the suppression of the vibration of the bridge.

14. The assembly of claim 13 wherein the bridge has an upper end, a lower end and a longitudinal axis, and wherein the vibration mitigation assembly further comprises:

a pair of beam members each having a first end and a second end, the first end of each beam member connected to the lower side of the bridge and the second end extending a distance downward therefrom, the beam members spaced apart a predetermined distance along a line parallel to the longitudinal axis of the bridge, the second end of the cylinder pivotally connected to the second end of one of the beam members and the piston rod pivotally connected to the second end of the other beam member such that the vibration mitigation assembly is mounted substantially parallel to the longitudinal axis of the bridge.

15. The assembly of claim 14 further comprising a second vibration mitigation assembly, the second vibration mitigation assembly comprising:

a second cylinder having a first end and a second end;

a second piston slidably disposed in the second cylinder, the second piston defining a first fluid chamber and a second fluid chamber in the second cylinder with the first and second fluid chambers having a compressible fluid disposed therein;

a second piston rod having one end connected to the second piston and another end extending from the first end of the second cylinder;

second valve means operably connected to the control means for interconnecting the first fluid chamber and the second fluid chamber of the second cylinder so as to provide fluid flow between the first fluid chamber and the second fluid chamber of the second cylinder and for regulating the flow of the fluid between the first fluid chamber and the second fluid chamber of the second cylinder; and a second pair of beam members each having a first end and a second end, the first end of each beam member connected to the lower side of the bridge and the second end extending a distance downward therefrom such that the second pair of beam members are spaced apart a predetermined distance along a line parallel to the longitudinal axis of the bridge, the second end of the second cylinder pivotally connected to the second end of one of the beam members of the second pair of beam members and the piston rod pivotally connected to the second end of the other beam member of the second pair of beam members such that the second cylinder, the second piston, and the second piston rod are connected to the bridge in a parallel relationship relative the first cylinder, the first piston, and the first piston rod.

16. The assembly of claim 15 wherein the second pair of beam members are spaced apart a predetermined distance along a line parallel to the longitudinal axis of the bridge and spaced from the first beam members in a staggered relationship, and wherein the second end of the second cylinder is pivotally connected to the second end of one of the beam members of the second pair of beam members and the piston rod is pivotally connected to the second end of the other beam member of the second pair of beam members such that the second cylinder, the second piston, and the second piston rod are connected to the bridge in an overlapping, parallel relationship relative to the first cylinder, the first piston, and the first piston rod.

17. The assembly of claim 13 wherein the vibration mitigation assembly further comprises:

an extension member for pivotally connecting the second end of the cylinder to one of the beam members, the extension member having a first end pivotally connected to one of the beam members and a second end connected to the second end of the cylinder.

18. The assembly of claim 13 wherein the bridge has an upper end, a lower end, a longitudinal axis, and at least two longitudinal beams, and wherein the vibration mitigation assembly further comprises:

a pair of torque bars secured between the beams a predetermined distance apart; and a pair of beam members each having a first end and a second end, the first end of each beam member connected to one of the torque bars, respectively, and the second end extending a distance upward therefrom such that the beam members are spaced apart a predetermined distance along a line parallel to the longitudinal axis of the bridge, the second end of the cylinder pivotally connected to the second end of one of the beam members and the piston rod pivotally connected to the second end of the other beam member such that the vibration mitigation assembly is mounted substantially parallel to the longitudinal axis of the bridge.

19. An assembly, comprising:

a building; and a vibration mitigation assembly for suppressing vibration of the building, the vibration mitigation assembly comprising:

a cylinder having a first end and a second end, the second end of the cylinder being connected to a portion of the building;

a piston slidably disposed in the cylinder, the piston defining a first fluid chamber and a second fluid chamber in the cylinder with each of the first and second fluid chambers having a compressible fluid disposed therein;

a piston rod having one end connected to the piston and another end extending from the first end of the cylinder and connected to another portion of the building;

valve means for interconnecting the first fluid chamber to the second fluid chamber so as to provide fluid flow between the first fluid chamber and the second fluid chamber and for regulating the flow of the fluid between the first fluid chamber and the second fluid chamber;

structural sensor means for measuring the vibration of the building and for generating a data signal representing the vibration of the structure;

piston sensor means for measuring the movement of the piston relative to the cylinder and for generating a data signal representing the movement of the piston relative to the cylinder;

pressure sensor means for measuring the pressure in the first fluid chamber and the second fluid chamber and for generating a data signal representing the pressure differential between the first fluid chamber and the second fluid chamber; and control means operably connected to the valve means for generating a control signal in response to the data signals received by the control means from the structure sensor means, the piston sensor means, and the pressure sensor means, and for outputting the control signal to the valve means to regulate the flow of the fluid between the first and second fluid chambers of the cylinder such that elastic energy generated by elastic deformation of the compressible fluid in the first and second fluid chambers is selectively stored in and released from the fluid and the amount of vibration energy dissipated from the building is selectively varied whereby both a stiffness of the building and the amount of damping of the vibration of the building are continuously adjusted to maximize the suppression of the vibration of the building.

20. The assembly of claim 19 wherein the second end of the cylinder is pivotally connected to a portion of the building and wherein the piston rod is pivotally connected to a diagonally opposing portion of the building.

21. A method for suppressing vibration of a bridge, the method comprising the steps of:

providing a cylinder having a first end and a second end with a piston slidably disposed in the cylinder so as to define a first fluid chamber and a second fluid chamber in the cylinder, the piston having a piston rod extending from the first end of the cylinder, each of the first and second pressure chambers having a compressible fluid disposed therein;

interconnecting the first fluid chamber and the second fluid chamber with a valve assembly so as to provide regulated fluid communication between the first fluid chamber and the second fluid chamber;

connecting the first end of the cylinder to a portion of the bridge and connecting the piston rod to another portion of the bridge;

sensing vibration of the bridge and generating a data signal representing the vibration of the bridge;

sensing movement of the piston relative to the cylinder and generating a data signal representing the movement of the piston relative to the cylinder;

measuring the pressure in the first fluid chamber and the second fluid chamber and generating a data signal representing the pressure differential between the first fluid chamber and the second fluid chamber;

generating a control signal in response to the data signals representing the vibration of the bridge, the data signal representing the movement of the piston relative to the cylinder, and the data signal representing the pressure differential between the first fluid chamber and the second fluid chamber; and outputting the control signal to the valve assembly to regulate the flow of the fluid between the first and second fluid chambers of the cylinder such that elastic energy generated by elastic deformation of the compressible fluid in the first and second fluid chambers is selectively stored in and released from the fluid and the amount of vibration energy dissipated from the bridge is selectively varied whereby both a stiffness of the bridge and the amount of damping of the vibration of the bridge are continuously adjusted to maximize the suppression of the vibration of the bridge.

22. The method of claim 21 wherein the bridge has an upper side, a lower side, and a longitudinal axis, and wherein the step of connecting the second end of the cylinder to a portion of the bridge and connecting the piston rod to another portion of the bridge comprises the step of:

connecting a pair of beam members, each having a first end and a second end, to the lower side of the bridge such that the first end of the beam members is connected to the lower side of the bridge and the second end extends a distance downward therefrom and such that the beam members are spaced apart a predetermined distance along a line parallel to the longitudinal axis of the bridge;

pivotally connecting the second end of the cylinder to the second end of one of the beam members; and pivotally connecting the piston rod to the second end of the other beam member such that the cylinder and the piston rod are mounted substantially parallel to the longitudinal axis of the bridge.

23. The method of claim 22 wherein the step of connecting the second end of the cylinder to a portion of the bridge and the piston rod to another portion of the bridge further comprises the steps of:

interconnecting the second end of the cylinder to the second end of one of the beam members with a rigid extension member.

24. The method of claim 22 further comprising the steps of:

providing a second cylinder having a first end and a second end with a piston slidably disposed in the second cylinder so as to define a first fluid chamber and a second fluid chamber in the second cylinder, the piston having a piston rod connected thereto such that the piston rod extends from the first end of the second cylinder, each of the first and second pressure chambers of the second cylinder having a compressible fluid disposed therein;

interconnecting the first fluid chamber and the second fluid chamber of the second cylinder with a second valve assembly so as to provide regulated fluid communication between the first fluid chamber and the second fluid chamber of the second cylinder;

connecting a second pair of beam members, each having a first end and a second end, to the lower side of the bridge such that the first end is connected to the lower side of the bridge and the second end extends a distance downward therefrom and such that the second pair of beam members are spaced apart a predetermined distance along a line parallel to the longitudinal axis of the bridge and spaced from the first pair of beam members in a staggered relationship;

pivotally connecting the second end of the second cylinder to the second end of one of the beam members of the second pair of beam members; and pivotally connecting the piston rod of the second cylinder to the second end of the other beam member of the second pair of beam members such that the second cylinder and the piston rod of the second cylinder are connected to the bridge in an overlapping, parallel relationship relative the first cylinder and the first piston rod.

25. A method for suppressing vibration of a building, the method comprising the steps of:

providing a cylinder having a first end and a second end with a piston slidably disposed in the cylinder so as to define a first fluid chamber and a second fluid chamber in the cylinder, the piston having a piston rod extending from the first end of the cylinder, each of the first and second pressure chambers having a compressible fluid disposed therein;

interconnecting the first fluid chamber and the second fluid chamber with a valve assembly so as to provide regulated fluid communication between the first fluid chamber and the second fluid chamber;

connecting the first end of the cylinder to a portion of the building and connecting the piston rod to another portion of the building;

sensing vibration of the building and generating a data signal representing the vibration of the building;

sensing movement of the piston relative to the cylinder and generating a data signal representing the movement of the piston relative to the cylinder;

measuring the pressure in the first fluid chamber and the second fluid chamber and generating a data signal representing the pressure differential between the first fluid chamber and the second fluid chamber;

generating a control signal in response to the data signals representing the vibration of the building, the data signal representing the movement of the piston relative to the cylinder, and the data signal representing the pressure differential between the first fluid chamber and the second fluid chamber; and outputting the control signal to the valve assembly to regulate the flow of the fluid between the first and second fluid chambers of the cylinder such that elastic energy generated by elastic deformation of the compressible fluid in the first and second fluid chambers is selectively stored in and released from the fluid and the amount of vibration energy dissipated from the building is selectively varied whereby both a stiffness of the building and the amount of damping of the vibration of the building are continuously adjusted to maximize the suppression of the vibration of the building.

26. The method of claim 25 wherein the step of connecting the second end of the cylinder to a portion of the building and connecting the piston rod to another portion of the building comprises the steps of:

pivotally connecting the second end of the cylinder to a portion of the building; and pivotally connecting the piston rod to a diagonally opposing portion of the building.

* * * * *

UNITED STATES PATENT AND TRADEMARK OFFICE
CERTIFICATE OF CORRECTION

PATENT NO. : 5,595,372
DATED : January 21, 1997
INVENTOR(S) : William N. Patten

It is certified that error appears in the above-indentified patent and that said Letters Patent is hereby corrected as shown below:

Column 1, line 53, delete "greather" and substitute therefor --greater--.

Column 3, line 56, delete "seal rings 66" and substitute therefor --seal rings 64--.

Column 3, line 56, after "energizing rings" insert --66--.

Column 6, equation (1), delete "$my+cy$" and substitute therefor --$m\ddot{y}+c\dot{y}$--.

Column 6, equation (4), delete "$Ay$" and substitute therefor --$A\dot{y}$--.

Column 6, equation (6), first line, delete "$x_2=y$" and substitute therefor --$x_2=\dot{y}$--.

Column 10, line 14, delete "assemblies" and substitute therefor --assembly--.

Column 10, line 57, delete "184".

Signed and Sealed this

Twentieth Day of May, 1997

Attest:

BRUCE LEHMAN

*Attesting Officer*   *Commissioner of Patents and Trademarks*